Nov. 10, 1925.
P. O. BROWN
1,561,308
VACUUM FEED LUBRICATING DEVICE
Filed May 23, 1925
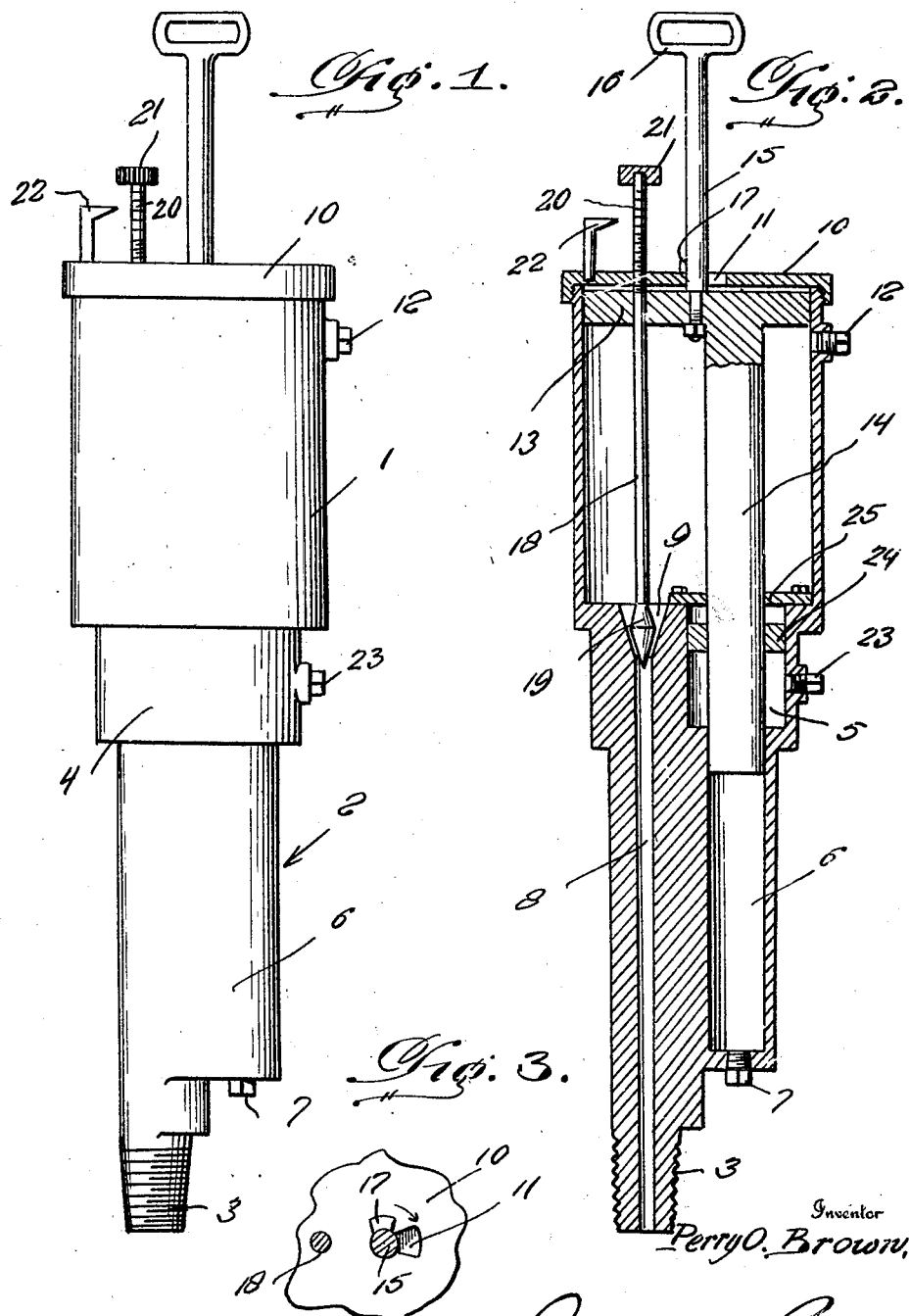

Patented Nov. 10, 1925.

1,561,308

UNITED STATES PATENT OFFICE.

PERRY O. BROWN, OF ST. VINCENT, MINNESOTA, ASSIGNOR OF ONE-HALF TO G. V. BACKSTROM, OF ST. VINCENT, MINNESOTA.

VACUUM-FEED LUBRICATING DEVICE.

Application filed May 23, 1925. Serial No. 32,430.

*To all whom it may concern:*

Be it known that I, PERRY O. BROWN, a citizen of the United States, residing at St. Vincent, in the county of Kittson and State of Minnesota, have invented certain new and useful Improvements in Vacuum-Feed Lubricating Devices, of which the following is a specification.

This invention relates to an improved lubricating device for journal box bearings and the like, and it has reference to one of the type embodying a cup or receptacle into which the lubricant is placed, and upon which it is continuously forced by a plunger.

More particularly the invention has reference to a device of this kind wherein the plunger is continuously sucked downwardly, under the action of vacuum or suction.

Briefly, the invention comprises a receptacle having a somewhat cylindrical extension on its bottom provided with a bore, through which the lubricant is forced, together with a cored out chamber, in which vacuum is created, the stem of the plunger extending into this vacuum chamber and being acted upon by the vacuum created, whereby to produce a continued downward pull upon the plunger head for injecting the lubricant.

The primary feature of the invention is, of course, the novel arrangement, whereby the vacuum is caused to act upon the plunger stem.

Another feature of the invention is the provision of a liquid seal between the vacuum chamber and stem, at the top of the chamber, thus preventing entrance of air and possible accidental release of the vacuum.

An additional feature is a swivelled handle connected to the plunger head and extending upwardly through the top of the oil receptacle, in a manner to permit the plunger to be lifted up to its starting position by hand, and then turned to temporarily lock it in such position.

A still further feature is an accurately gaged regulating device for the flow of the lubricant from the receptacle into the board passage leading to the part to be lubricated.

Other features and advantages of the invention will become apparent from the following description and drawings.

In the accompanying drawings, forming a part of this application, and in which like numerals are employed to designate like parts throughout the same:

Figure 1 is a side elevation of a lubricating device, constructed in accordance with the present invention.

Figure 2 is a central vertical section with parts in elevation.

Figure 3 is a detail section, showing the retaining means for the plunger.

In carrying out the invention, I employ a one piece casting which is formulated to provide a lubricant cup 1 at the top and a somewhat cylindrical extension 2, extending downwardly from the bottom of the cup. The extension is reduced, and screw threaded as indicated at 3, to provide an attaching nipple adapted to be tapped into a screw threaded socket in the journal box, bearing, or other part to which the device is attached. That portion of the extension adjacent the cup is increased in diameter as indicated at 4 and is of poured out, as indicated at 5, in Figure 2, to provide a fluid container. Beneath this container it is counter cored as indicated at 6 to provide what will be hereinafter designated as a vacuum chamber. At the bottom of this chamber is a screw threaded hole into which a closing plug 7 is screwed. Extending in parallelism with the portions 5 and 6 is a relatively small bore 8, serving as a passage, to conduct the lubricant from the cup 1 down through the discharge nipple 3. By preference, the upper end of the passage is enlarged slightly as at 9. The upper end of the cup is screw threaded on its exterior and a removable cover 10 is fitted thereon. Attention is directed to the fact that the cover is provided at its center, with a key hole shaped slot 1. Also, adjacent this slot is a screw hole, which serves a purpose to be hereinafter set forth. Furthermore, the cup 1 is provided in one side adjacent its top with a screw threaded opening, into which a plug 12 is fitted. This serves as a means for permitting the cup to be filled with a grease gun or the like.

The before mentioned plunger comprises a circular head 13 fitting snugly and slidably within the cup, and a depending cylindrical guide stem 14, extending downwardly through the chambers 5 and 6. It will be noted that the stem is eccentrically disposed. A rod 15 is swivelly connected to the center of the head and extends upwardly through the enlarged side of the slot 11, and is formed on its top with a hand grip 15. The exposed portion of the rod is equipped with a lug 17, forming a key, adapted to pass through the restricted portion of the slot 11. Located in the cup and extended in parallelism with the plunger 10 is a rod 18, having a tapered head 19, at its bottom, said head being located in the enlarged portion 9 of the passage, and constituting a means whereby the flow of oil from the cup is regulated. The rod 18 has a screw threaded portion at its top passing through the screw hole in the cover 10. Also, the rod is formed with the graduation 20, and has a finger grip 21 on its top. Cooperative with the graduations is a pointer or indicator 22, mounted upon the cover 10. It is yet to be pointed out that a screw hole is formed in one side of the container 5, and another plug 23 is fitted into this. Furthermore, a washer is located in the container 5, and the open upper end of this container is closed by a removable plate 25, through which the plunger 10 extends.

In practice, the handle 16 is grasped and the rod 15 pulled upwardly to lift the plunger head to its uppermost position as shown in Figure 2. Assuming that the cup 1 is empty, the plug 12 is removed, and the grease gun is attached, to fill the cup with an appropriate lubricant. With the plunger in this position, the rod 15 is turned, so that the lug 17 rests upon the cover, as indicated in Figure 3, to hold the plunger set. A fluid, preferably mercury, is placed in the chamber or container 5, and the washer 24 literally floats upon the surface of this. Care should be taken not to place too much mercury in the container, for under undue heat, the mercury will expand. Therefore, some little space must be left between the washer 24 and the closure plate 25. Obviously, this fluid constitutes a seal, by means of which air is absolutely prevented from entering the vacuum chamber 6. In order to produce a vacuum in the chamber 6, the air is sucked out through the plug opening at the bottom and the plug is replaced. A vacuum now serves to exert a continuous downward pull upon the plunger 10, and as soon as the key 17 is aligned with the restricted part of the key hole slot 11, the plunger will feed downwardly to eject the lubricant from the cup. Under some conditions, the fluidity of the lubricant may be such that the vacuum will be insufficent to eject it. This may be true when an exceedingly heavy grease is employed. Under such conditions, a suction line may be directly connected to the chamber 6, from any appropriate source, and the degree of suction should be such as to exert a forcible pull upon the plunger.

It is thought that a consideration of the foregoing description, in connection with the drawings, will enable persons skilled in the art to which the invention relates to obtain a clear understanding of the same. Therefore a more lengthy description is deemed unnecessary.

It is also evident from the foregoing, that a device of this kind is advantageous, in that it serves first, to provide uniform pressure for forcing the grease from the cup down into the bearing; second, to afford facilities for the proper adjustment of the device; third, to provide a continuously lubricated bearing; fourth, to prevent friction; and fifth, to provide proper facilities for economizing and saving needless waste and expense in the lubrication of bearings.

Minor changes coming within the field of invention may be resorted to, if desired.

I claim:

1. In a lubricating device of the class described, a lubricant cup, a suction chamber in communication with said cup, a plunger located in the cup and embodying a head, slidable in the latter, and a stem extending into said suction chamber, whereby the production of suction in said chamber will serve to move the plunger in the cup to eject the lubricant therefrom.

2. A lubricating device of the class described comprising a lubricant cup provided on its bottom with an extension having a bore forming a lubricant conducting passage and provided with cored out portions forming superposed chambers, a plunger embodying a head slidable in said cup, and a stem passing downwardly through said chamber, one of said chambers being adapted to permit the formation of a suction for acting upon the stem to exert a downward pull from the plunger for ejecting lubricant from the cup into said bore.

3. A lubricating device of the class described comprising an open topped cup having an extension formed on its bottom, said extension having a lubricant conducting passage and superposed cored out recesses, the upper one of which is adapted to contain a fluid, and the lower one of which is to function as a suction chamber, a plunger embodying a head snugly fitted for sliding in said cup, and a stem extending downwardly through said chamber, and fitting snugly into the suction chamber, a removable cover for the open top of the cup, a rod connected with the head of said plunger and extending upwardly with an opening in said top.

In testimony whereof I affix my signature.

PERRY O. BROWN.